United States Patent
Zhang et al.

(10) Patent No.: US 11,226,898 B2
(45) Date of Patent: Jan. 18, 2022

(54) DATA CACHING METHOD AND APPARATUS

(71) Applicant: ZTE CORPORATION, Guangdong (CN)

(72) Inventors: Guangyan Zhang, Guangdong (CN); Hongzhang Yang, Guangdong (CN); Guiyong Wu, Guangdong (CN); Shengmei Luo, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 125 days.

(21) Appl. No.: 16/487,817

(22) PCT Filed: Jan. 24, 2018

(86) PCT No.: PCT/CN2018/073965
§ 371 (c)(1),
(2) Date: Aug. 21, 2019

(87) PCT Pub. No.: WO2018/153202
PCT Pub. Date: Aug. 30, 2018

(65) Prior Publication Data
US 2021/0133103 A1 May 6, 2021

(30) Foreign Application Priority Data
Feb. 21, 2017 (CN) .......................... 201710091829.0

(51) Int. Cl.
*G06F 12/00* (2006.01)
*G06F 12/0811* (2016.01)
(Continued)

(52) U.S. Cl.
CPC ...... *G06F 12/0811* (2013.01); *G06F 12/0238* (2013.01); *G06F 12/0868* (2013.01); *G06F 12/0891* (2013.01); *G06F 2212/154* (2013.01)

(58) Field of Classification Search
CPC ............ G06F 12/0811; G06F 12/0238; G06F 12/0868; G06F 12/0891; G06F 2212/154
See application file for complete search history.

(56) References Cited

U.S. PATENT DOCUMENTS 8,447,948 B1 *  5/2013  Erdogan ............. G06F 12/0871
                                                        711/173
2010/0299553 A1  11/2010  Cen
(Continued)

FOREIGN PATENT DOCUMENTS

CN          1655130 A       8/2005
CN        104298560 A       1/2015
(Continued)

OTHER PUBLICATIONS

European Patent Office, European Patent Search Report dated Sep. 8, 2020 corresponding to EP Application No. 18757536.0.
WIPO, International Search Report dated Apr. 20, 2018.

*Primary Examiner* — Shawn X Gu
(74) *Attorney, Agent, or Firm* — Vivacqua Crane PLLC

(57) ABSTRACT

Disclosed in the present disclosure is a data caching method and apparatus, the data caching method includes the following steps: receiving a data request message sent by a user terminal; if detecting that a cache apparatus does not include the target access data requested by the data request message, then sending the target access data in a storage apparatus to the user terminal; extracting parameter information of the target access data in the storage apparatus, and determining whether the parameter information matches a preset parameter condition; and, if the parameter information matches the preset parameter condition, then transmitting the target access data to the cache apparatus.

4 Claims, 3 Drawing Sheets

(51) Int. Cl.
*G06F 12/02* (2006.01)
*G06F 12/0868* (2016.01)
*G06F 12/0891* (2016.01)

(56) References Cited

U.S. PATENT DOCUMENTS

| | | |
|---|---|---|
| 2011/0113200 A1 | 5/2011 | Moses et al. |
| 2012/0210066 A1* | 8/2012 | Joshi ................ G06F 12/0811 |
| | | 711/118 |
| 2014/0129779 A1 | 5/2014 | Frachtenberg et al. |
| 2018/0004560 A1* | 1/2018 | Shankar ............... G06F 9/4856 |

FOREIGN PATENT DOCUMENTS

| | | |
|---|---|---|
| CN | 104539727 A | 4/2015 |
| WO | 20090121413 A1 | 10/2009 |

* cited by examiner

DATA CACHING METHOD AND APPARATUS

CROSS-REFERENCE TO RELATED APPLICATIONS

This is a National Phase application filed under 35 U.S.C. 371 as a national stage of PCT/CN2018/073965, filed on Jan. 24, 2018, an application claiming the priority of Chinese Patent Application No. 201710091829.0, filed on Feb. 21, 2017, the contents of which are incorporated herein in their entirety by reference.

FIELD OF THE INVENTION

The present disclosure relates to the field of data storage technology, particularly to a data caching method and a data cache apparatus.

BACKGROUND OF THE INVENTION

A distributed storage system includes a plurality of storage apparatuses, a cache apparatus and an input/output (I/O) bus, data are transferred among the storage apparatuses through the I/O bus, and an efficient and inexpensive data storage can be achieved based on data scattering arrangement among the storage apparatuses. The distributed storage system is widely used in the field of intensive computing and cloud computing for its great extension ability.

A traditional data caching method applied in the distributed storage system usually adopts a strategy of import on demand. That is, if it is detected that there are no data in the cache apparatus meeting user's request, importing those data stored in the storage apparatus to the cache apparatus as a respond to the request of a user terminal. However, since the cache apparatus has a limited capacity, the data imported into the cache apparatus during the above process are going to replace other data in the cache apparatus. Besides, there are also the following problems: if the data newly imported into the cache apparatus are not ever being accessed or the number of accesses of which is less in subsequent processes, and the data replaced by the newly imported data are needed to be accessed many times, storage resources of the cache apparatus are occupied by the newly imported data, and the storage resources cannot be used to full advantage. In addition, since caching granularity is large in the distributed storage mode, a lot of network bandwidth and storage read/write overhead are required for caching operation on data blocks. Therefore, the data caching method applied in the distributed storage system has a problem of low use efficiency in storage resources.

SUMMARY OF THE INVENTION

The present disclosure provides a data caching method and a data cache apparatus.

According to an embodiment of the present disclosure, there is provided a data caching method including: receiving a data request message sent from a user terminal; sending a target access data in a storage apparatus to the user terminal if it is detected that a cache apparatus does not include the target access data requested by the data request message; extracting a parameter information correlated to the target access data in the storage apparatus, and determining whether the parameter information matches a preset parameter condition; and transmitting the target access data to the cache apparatus if the parameter information matches the preset parameter condition.

In some embodiments, the parameter information includes the number of accesses, and the step of transmitting the target access data to the cache apparatus if the parameter information matches the preset parameter condition includes: transmitting the target access data to the cache apparatus if the number of accesses is larger than or equal to a preset first threshold value.

In some embodiments, the parameter information includes the number of accesses and access time, and the step of transmitting the target access data to the cache apparatus if the parameter information matches the preset parameter condition includes: transmitting the target access data to the cache apparatus if the number of accesses is larger than or equal to a preset second threshold value and the access time is within a preset period.

In some embodiments, after the step of transmitting the target access data to the cache apparatus, the method further includes: detecting a cache occupancy rate of the cache apparatus; and clearing out the data for which the number of accesses is less than or equal to a preset fourth threshold value from the cache apparatus and/or transmitting modified data in the cache apparatus to the storage apparatus if the cache occupancy rate is larger than or equal to a preset third threshold value.

In some embodiments, after the step of receiving the data request message sent from the user terminal, the method further includes: backing up cache information redundancy in an internal memory of the cache apparatus to a persistent storage device of the cache apparatus; and restoring the persistent cache information in the cache apparatus to the cache apparatus if it is detected that a node failure or system breakdown is occurred in the cache apparatus.

In some embodiments, after the step of transmitting the target access data to the cache apparatus, the method further includes: sending the target access data in the cache apparatus to the user terminal if it is detected that the cache apparatus includes the target access data requested by the data request message.

According to another embodiment of the present disclosure, there is provided a computer readable medium having program instructions stored therein, the program instructions causes a computer to perform the above data caching method.

According to another embodiment of the present disclosure, there is provided a data caching apparatus including: a receiving module configured to receive a data request message sent from a user terminal; a transmitting module configured to send a target access data in a storage apparatus to the user terminal if it is detected that a cache apparatus does not include the target access data requested by the data request message; an extracting module configured to extract a parameter information correlated to the target access data in the storage apparatus, and determine whether the parameter information matches a preset parameter condition; and a transmission module configured to transmit the target access data to the cache apparatus if the parameter information matches the preset parameter condition.

In some embodiments, the parameter information includes the number of accesses; and the preset parameter condition is that the number of accesses is larger than or equal to a preset first threshold value.

In some embodiments, the parameter information includes the number of accesses and access time; and the preset parameter condition is that the number of accesses is larger than or equal to a preset second threshold value and the access time is within a preset period.

In some embodiments, the data caching apparatus further includes: a detecting module configured to detect a cache occupancy rate of the cache apparatus; and a processing module configured to clear out the data for which the number of accesses is less than or equal to a preset fourth threshold value from the cache apparatus and/or transmitting modified data in the cache apparatus to the storage apparatus if the cache occupancy rate is larger than or equal to a preset third threshold value.

In some embodiments, the data caching apparatus further includes: a back-up module configured to back up cache information redundancy in an internal memory of the cache apparatus to a persistent storage device of the cache apparatus; and a restoring module configured to restore the persistent cache information in the cache apparatus to the cache apparatus if it is detected that a node failure or system breakdown is occurred in the cache apparatus.

In some embodiments, the transmitting module is further configured to send the target access data in the cache apparatus to the user terminal if it is detected that the cache apparatus includes the target access data requested by the data request message.

DETAILED DESCRIPTION OF THE EMBODIMENTS

Figure 1:
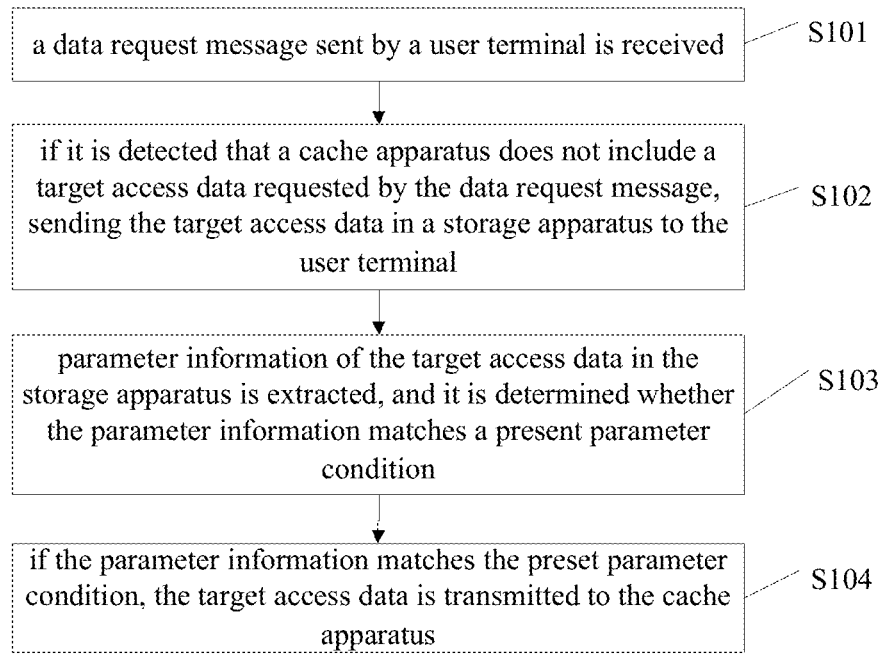
FIG. 1 is a flow chart of a data caching method according to an embodiment of the present disclosure.

Hereinafter, a detailed description is provided to the exemplary embodiments of the present disclosure with respect to the accompanying drawings. As shown in FIG. 1, a data caching method according to an embodiment of the present disclosure includes steps S101 to S104.

At step S101, receiving the data request message sent from the user terminal. In this step, data accessing is performed between the user terminal and a server by using the data request message. The user terminal may be a mobile phone, a Tablet Personal Computer, a Laptop Computer, a Personal Digital Assistant (PDA), a Mobile Internet Device (MID), a Wearable Device, or the like. The server adopts a distributed storage method, and includes a cache apparatus and a storage apparatus.

Figure 2:
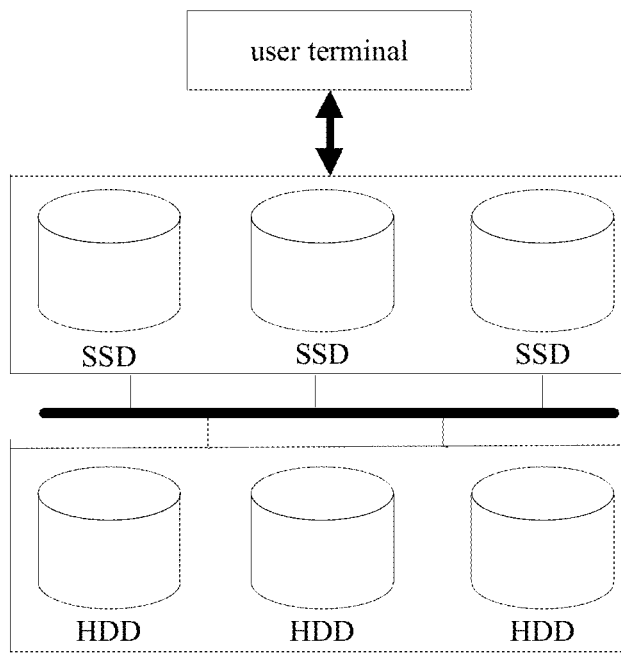
FIG. 2 is a schematic diagram of a data caching method according to an embodiment of the present disclosure.

As shown in FIG. 2, the cache apparatus is an apparatus that is fast in reading and writing, for example, the cache apparatus includes a Solid State Drives (SSD), and the storage apparatus is an apparatus that is slow in reading and writing, for example, the storage apparatus includes a Hard Disk Drive (HDD).

According to an instance of the present embodiment of the data caching method, cold data (data for which the number of accesses is less) are separated from hot data (data for which the number of accesses is greater); that is, storing the hot data in SSD and cold data in HDD, and controlling data transmission between the cache apparatus and the storage apparatus based on Hot Spot Detection (HOSD) module of the server. It is to be noted that, in order to ensure stability of data request between the user terminal and the server, the data transmission between the user terminal and the server may be performed by using public network, and the data transmission inside the server between the cache apparatus and the storage apparatus may be performed by using cluster network, to achieve data flow between the cache apparatus and the storage apparatus.

Figure 3:
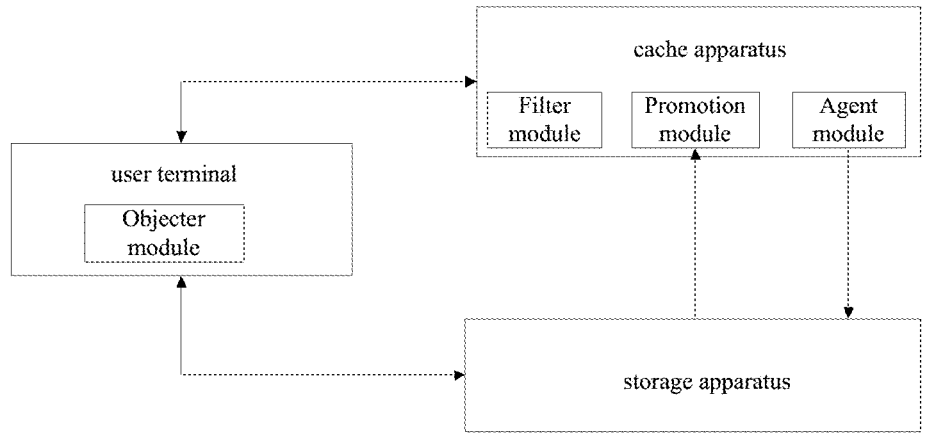
FIG. 3 is a schematic diagram of step S102 in the data caching method according to an embodiment of the present disclosure.

At step S102, if it is detected that the cache apparatus does not include the target access data requested by the data request message, sending the target access data in the storage apparatus to the user terminal. In this step, as shown in FIG. 3, the server (not shown) receives the data request message sent by Objecter module in the user terminal, determines the requested target access data based on the data request message, and compares the target access data to data in the cache apparatus. If the cache apparatus does not include the target access data, sending the target access data in the storage apparatus to the user terminal, such that influence on I/O latency caused by caching operation is reduced. The cache apparatus may include Filter module, Promotion module and Agent module. The Promotion module is in charge of transmitting the target access data from the storage apparatus to the cache apparatus. The Agent module is in charge of transmitting dirty data (i.e., modified data) in the cache apparatus to the storage apparatus, or clearing out the cold data (data for which the number of accesses is less) in the cache apparatus, to improve utilization rate of the storage resources and data access hit ratio of the user terminal.

In an instance of the present embodiment, the step S102 further includes: if it is detected that the cache apparatus includes the target access data requested by the data request message, sending the target access data in the cache apparatus to the user terminal.

At step S103, extracting parameter information of the target access data in the storage apparatus, and determining whether the parameter information of the target access data matches a preset parameter condition. In this step, the parameter information may include the number of accesses, or may include the number of accesses and the access time. If the parameter information is the number of accesses, it is determined whether the number of accesses is larger than or equal to a preset first threshold value, wherein the preset first threshold value may be 3, 5, 6, etc.

In addition, if the parameter information includes the number of accesses and the access time, it is determined whether the number of accesses of the target access data is larger than or equal to a preset second threshold value and whether the access time for the target access data is within a preset period. Herein, the preset second threshold value may be 3, 5, 6, etc. In an instance of the present embodiment, "the access time for the target access data is within the preset period" means that time interval between the latest access time for the target access data and the current time is within the preset period. In another instance of the present embodiment, "the access time for the target access data is within the preset period" may indicate that the latest access time for the target access data is within the preset period. For example, the preset period may be an hour, a day, a week, etc. By adding the step of determining the access time for data, the efficiency of the target access data may be ensured.

At step S104, if the parameter information of the target access data matches the preset parameter condition, transmitting the target access data to the cache apparatus. In this step, the determination process of whether the parameter information of the target access data matches the preset parameter condition is illustrated by referring to the step S103. By transmitting the target access data corresponding to the preset parameter condition to the cache apparatus to make the data stored in the cache apparatus become data of high hit probability, cache pollution problem of the cache apparatus is effectively solved, and the utilization rate of cache is improved.

In an instance of the present embodiment, the step S104 includes: if the parameter information of the target access data matches the preset parameter condition, transmitting the target access data stored in the storage apparatus to the cache apparatus.

In an instance of the present embodiment, the steps S103 and S104 are performed asynchronously with the steps S101 and S102. For instance, the steps S103 and S104 may be performed in preset time cycle. In this way, caching operations are performed asynchronously, such that the influence on I/O latency caused by caching operations is avoided.

In an instance of the present embodiment, the parameter information includes the number of accesses. The step of "if the parameter information of the target access data matches the preset parameter condition, transmitting the target access data to the cache apparatus" includes: if the number of accesses to the target access data is larger than or equal to the preset first threshold value, transmitting the target access data to the cache apparatus, wherein the first threshold value may be 3, 5, 6, etc. In the instance, through the above steps, the data being accessed frequently may be transmitted to the cache apparatus to facilitate the user terminal directly accessing the cache apparatus, and the data being accessed infrequently stays in the storage apparatus, such that data flow overhead between the cache apparatus and the storage apparatus may be reduced. Since all of the data stored in the cache apparatus are data being accessed frequently, cache pollution may be reduced.

In another instance of the present embodiment, the parameter information includes both of the number of accesses and the access time. The step of "if the parameter information of the target access data matches the preset parameter condition, transmitting the target access data to the cache apparatus" includes: if the number of accesses of the target access data is larger than or equal to a preset second threshold value and the access time of the target access data is within the preset period, transmitting the target access data to the cache apparatus. By adding the step of determining the access time for data, the efficiency of the target access data may be ensured.

In some embodiments, the data caching method further includes: after the step of transmitting the target access data to the cache apparatus, detecting cache occupancy rate of the cache apparatus; and if the cache occupancy rate is larger than or equal to a preset third threshold value, clearing out the data for which the number of accesses is less than or equal to a preset fourth threshold value from the cache apparatus and/or transmitting modified data in the cache apparatus to the storage apparatus, wherein the third threshold value may be 80%, 85%, 90%, etc. In the embodiment, through the above steps, the cache apparatus may have spare storage space for other data accessing. The data for which the number of accesses is less than or equal to the preset fourth threshold value are cold data, and the modified data in the cache apparatus are dirty data. In data replacement, the number of accesses and the access time of data may be taken into account, to ensure data block being kicked out from the cache apparatus in the replacement are data block of low hit probability (that is, data with low probability of being accessed).

Figure 4:
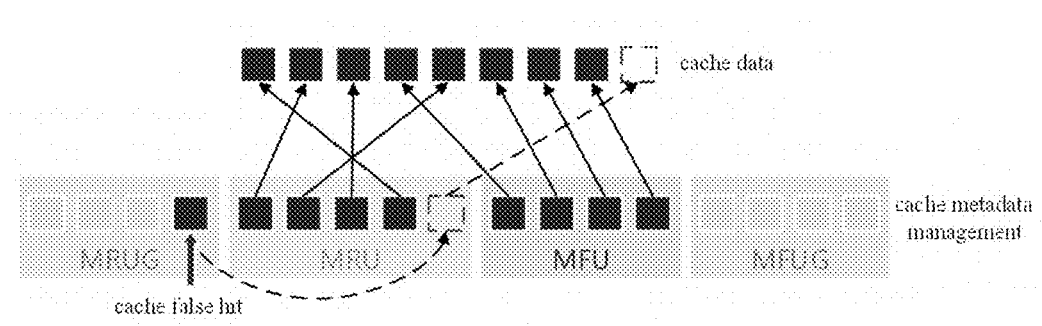
FIG. 4 is a schematic diagram of step S104 in the data caching method according to an embodiment of the present disclosure.

The implementation process is shown in FIG. 4, which includes four linked lists, such as MRU, MFU, MRUG and MFUG. One end of queue of the linked list MRU is MRU end, the other end is LRU end, one end of queue of the linked list MFU is MFU end, the other end is LFU end. When data enters the cache apparatus, the data is put into the MRU queue firstly. The MRU queue is a finite sequence which sequencing data blocks according to their access time. When a new data enters the MRU queue, the data block at the LRU end of the MRU queue (that is, the data block which hasn't been accessed for the longest time) is kicked out. If a data block in the MRU queue has been accessed again before being kicked out, putting the data block back to the MFU end of the MFU queue.

MFU linked list is also a finite sequence which sequencing data according to their access time. Different from the MRU linked list, every time a second hit occurs, the corresponding data in the MFU linked list is put at MFU head (MFU end). If there are data which are required entering into the cache apparatus, and the number of data blocks in the cache apparatus has reached the preset threshold value, some data will be kicked out from LRU and LFU ends, and their corresponding metadata information will be respectively sent into MFUG queue and MRUG queue.

MFUG and MRUG are not used for storing data blocks, but storing only access logs of the data blocks. When a data block of the MFU linked list is sent to the MFUG linked list, the storage space taken by the data block is released. If a data block to be released is in the MRU linked list, the data block is deleted from the MRU linked list, and sent to the MRUG linked list.

Bothe of the MFUG and MRUG linked lists are first in first out (FIFO) linked list having a threshold length value x. When a linked list has its length increased to x, the earliest access log is deleted from the linked list. When the data block is accessed again, if it is in the MRUG or MFUG linked list, it is read from storage tank, and inserted into the MRU or MFU linked list again. HOSD module may dynamically adjust the number of data elements that should be included in the MRU and MFU linked lists according to the number of false hits in the MRUG or MFUG linked list. The adjusting process includes: when a false hit occurs in the MRUG linked list, the length of the MRU linked list is increased by 1, and the length of the MFU linked list is decreased by 1; when a false hit occurs in the MFUG linked list, the length of the MFU linked list is increased by 1, and the length of the MRU linked list is decreased by 1. In this way, the total length of the MRU and MFU linked lists in the cache apparatus is constant.

In some embodiments, the method further includes: after the step of transmitting the target access data to the cache apparatus, backing up cache information redundancy in an internal memory of the cache apparatus to a persistent storage device of the cache apparatus; and if it is detected that a node failure or system breakdown is occurred in the cache apparatus, restoring the persistent cache information in the cache apparatus to the cache apparatus. In the embodiment, the cache metadata information in the internal memory of the cache apparatus is packed at every set time interval as an object for backup. The data to be backed up are writing as checkpoints into the persistent storage device of the cache apparatus by using a write logic in the storage apparatus, wherein the checkpoints are performed periodically without adding load to the system. When it is detected that the cache metadata information is lost due to the node failure or system breakdown occurred in the cache apparatus, the data backed up in the persistent storage device of the cache apparatus is restored to the cache apparatus, to ensure normal operation during the node failure or system breakdown, and ensure a good fault tolerance ability of the system.

By using the data caching method according to the embodiments of the present disclosure, the cache apparatus only stores data meeting the preset parameter condition (for example, the data for which the number of accesses is greater), the data for which the number of accesses is less will not occupy the storage space of the cache apparatus, thus improving utilization rate of the storage resources and data access hit ratio of the user terminal.

Figure 5:
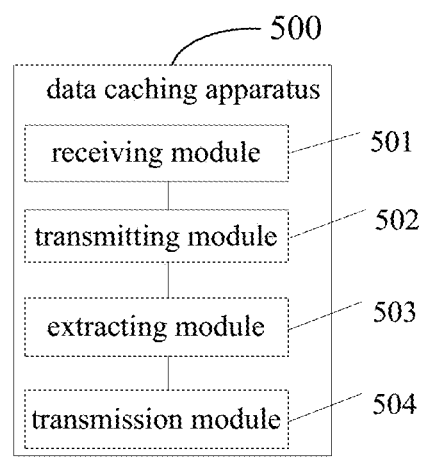
FIG. 5 is a schematic diagram of a data caching apparatus according to an embodiment of the present disclosure.

As shown in FIG. 5, a data caching apparatus 500 according to an embodiment of the present disclosure includes: a receiving module 501 used for receiving data request message sent from the user terminal; a transmitting module 502 used for detecting whether a cache apparatus includes a target access data requested by the data request message, if it is detected that the cache apparatus does not include the target access data requested by the data request message, the target access data in the storage apparatus is sent to the user terminal; a extracting module 503 used for extracting parameter information of the target access data in the storage apparatus, and determining whether the parameter information of the target access data matches a preset parameter condition; and a transmission module 504 for transmitting the target access data to the cache apparatus when the parameter information of the target access data matches the preset parameter condition.

In some embodiments, the parameter information includes the number of accesses. If the number of accesses for the target access data is larger than or equal to a preset first threshold value, the transmission module 504 transmits the target access data to the cache apparatus.

In some embodiments, the parameter information includes the number of accesses and the access time. If the number of accesses for the target access data is larger than or equal to a preset second threshold value and the access time for the target access data is within a preset period, the transmission module 504 transmits the target access data to the cache apparatus.

In some embodiments, the transmitting module 502 is further configured to send the target access data in the cache apparatus to the user terminal when it is detected that the cache apparatus includes the target access data requested by the data request message.

Figure 6:
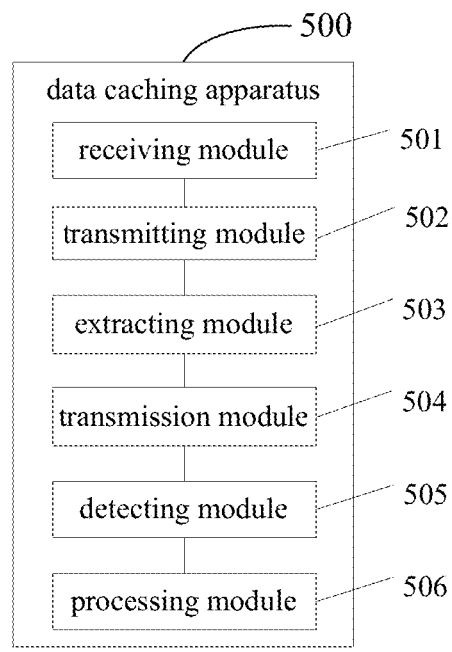
FIG. 6 is a schematic diagram of a data caching apparatus according to another embodiment of the present disclosure.

In some embodiments, as shown in FIG. 6, the data caching apparatus 500 further includes: a detecting module 505 used for detecting a cache occupancy rate of the cache apparatus; and a processing module 506 used for clearing out data for which the number of accesses is less than or equal to a preset fourth threshold value from the cache apparatus and/or transmitting modified data in the cache apparatus to the storage apparatus when the cache occupancy rate is larger than or equal to a preset third threshold value.

Figure 7:
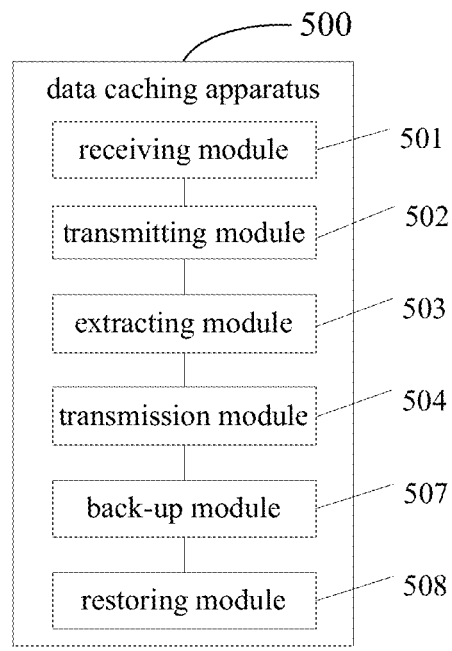
FIG. 7 is a schematic diagram of a data caching apparatus according to another embodiment of the present disclosure.

In some embodiments, as shown in FIG. 7, the data caching apparatus 500 further includes: a back-up module 507 used for backing up cache information redundancy in an internal memory of the cache apparatus to a persistent storage device of the cache apparatus; and a restoring module 508 used for restoring the persistent cache information in the cache apparatus to the cache apparatus when it is detected that a node failure or system breakdown is occurred in the cache apparatus.

In some embodiments, the data caching apparatus 500 is included in the cache apparatus. In this case, the cache apparatus may include hardware for executing functions of various modules.

In some embodiments, the data caching apparatus 500 is a separate apparatus from the cache apparatus and the storage apparatus.

It is to be noted that each step of the data caching method according to the present disclosure could be implemented by using the data caching apparatus 500, to improve utilization rate of the storage resources and data access hit ratio of the user terminal.

It can be understand by those ordinary skilled in the art that all or part of steps and/or modules of methods of the above embodiments may be implemented by using hardware correlated to program instructions, and the program instructions may be stored in a computer readable medium. The program instructions make computer perform the data caching method according to the present disclosure. The computer readable medium may be a Read-Only Memory (ROM), Random Access Memory (RAM), magnetic disc, or optical disk, etc.

For those skilled in the art, various changes and modifications may be made without departing from the generalized spirit and scope of the present disclosure. Therefore, the present specification and the accompany drawings are to be considered illustrative, and not restrictive.

The invention claimed is:

1. A data caching method comprising:
receiving a data request message sent from a user terminal;
sending a target access data in a storage apparatus to the user terminal if it is detected that a cache apparatus does not comprise the target access data requested by the data request message;
extracting a parameter information correlated to the target access data in the storage apparatus, and determining whether the parameter information matches a preset parameter condition;
transmitting the target access data to the cache apparatus if the parameter information matches the preset parameter condition;
wherein the parameter information comprises a number of accesses and access time, and
the step of transmitting the target access data to the cache apparatus if the parameter information matches the preset parameter condition comprises:
transmitting the target access data to the cache apparatus if the number of accesses is larger than or equal to a preset first threshold value;
transmitting the target access data to the cache apparatus if the number of accesses is larger than or equal to a preset second threshold value and the access time is within a preset period;
detecting a cache occupancy rate of the cache apparatus; and
clearing out data for which the number of accesses is less than or equal to a preset fourth threshold value from the cache apparatus and/or transmitting modified data in the cache apparatus to the storage apparatus if the cache occupancy rate is larger than or equal to a preset third threshold value.

2. The method of claim 1, wherein after the step of receiving the data request message sent from the user terminal, the method further comprises:
- backing up cache information redundancy in an internal memory of the cache apparatus to a persistent storage device of the cache apparatus; and
- restoring the persistent cache information in the cache apparatus to the cache apparatus if it is detected that a node failure or system breakdown is occurred in the cache apparatus.

3. The method of claim 1, wherein after the step of transmitting the target access data to the cache apparatus, the method further comprises:
- sending the target access data in the cache apparatus to the user terminal if it is detected that the cache apparatus comprises the target access data requested by the data request message.

4. A non-transitory computer readable storage medium having program instructions stored therein, the program instructions make a computer perform the method according to claim 1.

* * * * *